(12) United States Patent
Sandberg et al.

(10) Patent No.: US 9,960,941 B2
(45) Date of Patent: May 1, 2018

(54) CONTROLLING CYCLIC SHIFT FOR DEMODULATION REFERENCE SYMBOLS

(71) Applicant: TELEFONAKTIEBOLAGET LM ERICSSON (PUBL), Stockholm (SE)

(72) Inventors: David Sandberg, Solna (SE); Mats Åhlander, Täby (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days. days.

(21) Appl. No.: 15/301,935

(22) PCT Filed: Apr. 4, 2014

(86) PCT No.: PCT/EP2014/056884
§ 371 (c)(1),
(2) Date: Oct. 4, 2016

(87) PCT Pub. No.: WO2015/149878
PCT Pub. Date: Oct. 8, 2015

(65) Prior Publication Data
US 2017/0126452 A1    May 4, 2017

(51) Int. Cl.
*H04L 27/26*     (2006.01)
*H04L 1/18*      (2006.01)
*H04B 7/0452*    (2017.01)

(52) U.S. Cl.
CPC ........ *H04L 27/2613* (2013.01); *H04L 1/1812* (2013.01); *H04B 7/0452* (2013.01)

(58) Field of Classification Search
CPC .......... H04B 1/38; H04B 7/02; H04B 7/0452; H04B 17/00; H04J 3/00; H04J 3/06;
(Continued)

(56) References Cited

U.S. PATENT DOCUMENTS 9,730,193 B2 * 8/2017 Luo ..................... H04L 1/06
2009/0241004 A1 * 9/2009 Ahn ................... H04L 1/1812
714/749

(Continued)

FOREIGN PATENT DOCUMENTS

WO    2010147853 A2    12/2010
WO    2013125841 A1     8/2013

OTHER PUBLICATIONS

3GPP TS 36.211 v11.0.0; "Physical Channels and Modulation," 3rd Generation Partnership Project; Technical Specification Group Radio Access Network; Evolved Universal Terrestrial Radio Access (E-UTRA); (Release 11); Sep. 2012; 106 pages.

(Continued)

*Primary Examiner* — Shawkat M Ali
(74) *Attorney, Agent, or Firm* — Sage Patent Group (57) ABSTRACT

It is presented a method for controlling cyclic shift for demodulation reference symbols for uplink communication in a cellular communication network. The method is performed in a network node and comprises the steps of: determining a first cyclic shift parameter for demodulation reference symbols based on a current subframe index; generating a control message comprising the first cyclic shift parameter; and transmitting the control message to a wireless device of the cellular communication network. Corresponding network nodes, computer program and computer program product are also presented.

18 Claims, 2 Drawing Sheets

(58) Field of Classification Search
CPC ..... H04J 3/24; H04L 1/06; H04L 1/18; H04L 1/1812; H04L 1/1893; H04L 5/003; H04L 27/00; H04W 4/00; H04W 72/00; H04W 72/04; H04W 72/0406
USPC ........ 370/280, 329, 337, 350; 375/219, 224, 375/267, 295, 340
See application file for complete search history.

(56) References Cited

U.S. PATENT DOCUMENTS

| | | | |
|---|---|---|---|
| 2009/0268685 A1 | 10/2009 | Chen et al. | |
| 2011/0142107 A1* | 6/2011 | Pan | H04B 7/0671 375/219 |
| 2011/0317596 A1* | 12/2011 | Jongren | H04L 5/0053 370/280 |
| 2012/0140724 A1* | 6/2012 | Sipola | H04L 1/1607 370/329 |
| 2012/0281656 A1* | 11/2012 | Hooli | H04J 11/0023 370/329 |
| 2013/0163537 A1* | 6/2013 | Anderson | H04W 72/1284 370/329 |
| 2013/0329678 A1* | 12/2013 | Pan | H04L 1/1635 370/329 |
| 2014/0161002 A1* | 6/2014 | Gauvreau | H04W 16/24 370/280 |
| 2014/0362747 A1* | 12/2014 | Yang | H04L 1/1861 370/280 |

OTHER PUBLICATIONS

3GPP TS 36.211 v12.1.0; "Physical channels and modulation," 3rd Generation Partnership Project; Technical Specification Group Radio Access Network; Evolved Universal Terrestrial Radio Access (E-UTRA); (Release 12); Mar. 2014; 120 pages.

3GPP TS 36.213 v11.0.0; "Physical layer procedures," 3rd Generation Partnership Project; Technical Specification Group Radio Access Network; Evolved Universal Terrestrial Radio Access (E-UTRA); (Release 11); Sep. 2012; 143 pages.

PCT International Search Report and Written Opinion of the International Searching Authority, International Application No. PCT/EP2014/056884, dated Nov. 20, 2014, 10 pages.

* cited by examiner

CONTROLLING CYCLIC SHIFT FOR DEMODULATION REFERENCE SYMBOLS

CROSS-REFERENCE TO RELATED APPLICATIONS

This application is a national stage of International Application No. PCT/EP2014/056884, filed Apr. 4, 2014, which is hereby incorporated by reference.

TECHNICAL FIELD

The invention relates to controlling cyclic shift for demodulation reference symbols.

BACKGROUND

Hybrid Automatic Repeat Request (HARQ) is used in cellular communication networks such as LTE, due to the improvement in efficiency and robustness that it provides. An uplink HARQ process starts with the network node (such as an eNodeB) transmitting an uplink grant to the wireless device (such as User Equipment, UE). A certain time after receiving the uplink grant, the wireless device transmits uplink data on a shared channel according to the grant. The network node receives the transmission and attempts to decode the data. Depending on the success, the network node indicates success using an ACK (Acknowledgement) or failure using a NACK (Negative ACK) to the wireless device, implying whether a retransmission is needed or not. When a NACK is received by the wireless device, it performs a retransmission to allow the network node to attempt decoding again. Depending on the subsequent decoding result, more retransmissions can take place, up to a configurable maximum number of transmissions.

However, if the wireless device misinterprets an ACK as a NACK, it will retransmit without the network node expecting it, whereby the resources for the retransmission could have been assigned to another wireless device. This can cause serious problems for both wireless devices in terms of failed uplink transmissions which may not be resolved until the maximum number of transmission is reached.

SUMMARY

It is an object to reduce the likelihood of uplink conflicts.

According to a first aspect, it is presented a method for controlling cyclic shift for demodulation reference symbols for uplink communication in a cellular communication network. The method is performed in a network node and comprises the steps of: determining a first cyclic shift parameter for demodulation reference symbols based on a current subframe index; generating a control message comprising the first cyclic shift parameter; and transmitting the control message to a wireless device of the cellular communication network.

Using this method, wireless devices use cyclic shifts when the first cyclic shift parameter changes. Since the first cyclic shift parameter depends on the subframe index, this will change over time. The cyclic shift for retransmissions is the same as for the original transmission, whereby when the first cyclic shift parameter changes between the transmission of two wireless devices, a retransmission for one wireless device will have a different cyclic shift than the other. This allows the network node to, in many cases, still receive data sent on the same physical resource blocks by suppressing the data from the other wireless device using interference rejection.

The steps of determining, generating and transmitting may be repeated for each uplink grant.

The method may further comprise the steps of: receiving an uplink signal comprising an uplink signal component from the first wireless device and an uplink signal component from a second wireless device; obtaining a cyclic shift for demodulation reference symbols used by the first wireless device using the first cyclic shift parameter; and demodulating the uplink signal based on the cyclic shift to reduce interference from the uplink signal component from the second wireless device.

The step of demodulating may comprise using receivers for uplink multi-user multiple input multiple output, MIMO, reception.

The step of determining a first cyclic shift parameter may comprise using the same first cyclic shift parameter for a number of subframes which corresponds to the round trip time for Hybrid Automatic Repeat Request, HARQ.

The first cyclic shift parameter may be associated with a set of second cyclic shift parameters, wherein each one of the second cyclic shift parameters corresponds to a MIMO layer.

The step of determining a first cyclic shift parameter may comprise, when a new first cyclic shift parameter is to be selected, selecting a first cyclic shift parameter associated with a set of second cyclic shift parameters which all differ from all the second cyclic shift parameters associated with the previous first cyclic shift parameter.

The step of determining a first cyclic shift parameter may comprise, when a new first cyclic shift parameter is to be selected, selecting a first cyclic shift parameter such that the associated second cyclic shift parameter for the lowest MIMO layer is not repeated in a number of consecutive first cyclic shift parameters which is equal to the maximum number of HARQ transmissions.

The step of transmitting the control message may comprise transmitting a downlink control information message.

According to a second aspect, it is presented a network node for controlling cyclic shift for demodulation reference symbols for uplink communication in a cellular communication network. The network node comprises: a processor; and a memory storing instructions that, when executed by the processor, causes the network node to: determine a first cyclic shift parameter for demodulation reference symbols based on a current subframe index; generate a control message comprising the first cyclic shift parameter; and transmit the control message to a wireless device of the cellular communication network.

The network node may further comprise instructions that, when executed by the processor, causes the network node to repeat the instructions to determine, generate and transmit for each uplink grant.

The network node may further comprise instructions that, when executed by the processor, causes the network node to: receive an uplink signal comprising an uplink signal component from the first wireless device and an uplink signal component from a second wireless device; obtain a cyclic shift for demodulation reference symbols used by the first wireless device using the first cyclic shift parameter; and demodulate the uplink signal based on the cyclic shift to reduce interference from the uplink signal component from the second wireless device.

The instructions to demodulate may comprise instructions that, when executed by the processor, causes the network node to use receivers for uplink multi-user MIMO reception.

The instructions to determine a first cyclic shift parameter may comprise instructions that, when executed by the processor, causes the network node to use the same first cyclic shift parameter for a number of subframes which corresponds to the round trip time for Hybrid Automatic Repeat Request, HARQ.

The first cyclic shift parameter may be associated with a set of second cyclic shift parameters, wherein each one of the second cyclic shift parameters corresponds to a MIMO layer.

The instructions to determine a first cyclic shift parameter may comprise instructions that, when executed by the processor, causes the network node to, when a new first cyclic shift parameter is to be selected, select a first cyclic shift parameter associated with a set of second cyclic shift parameters which all differ from all the second cyclic shift parameters associated with the previous first cyclic shift parameter.

The instructions to determine a first cyclic shift parameter may comprise instructions that, when executed by the processor, causes the network node to, when a new first cyclic shift parameter is to be selected, selecting a first cyclic shift parameter such that the associated second cyclic shift parameter for the lowest MIMO layer is not repeated in a number of consecutive first cyclic shift parameters which is equal to the maximum number of HARQ transmissions.

The instructions to transmit the control message may comprise instructions that, when executed by the processor, causes the network node to transmit a downlink control information message.

According to a third aspect, it is presented a network node comprising: means for determining a first cyclic shift parameter for demodulation reference symbols based on a current subframe index, the first cyclic shift parameter being used to control cyclic shift for demodulation reference symbols for uplink communication in a cellular communication network; means for generating a control message comprising the first cyclic shift parameter; and means for transmitting the control message to a wireless device of the cellular communication network.

According to a fourth aspect, it is presented a computer program for controlling cyclic shift for demodulation reference symbols for uplink communication in a cellular communication network. The computer program comprises computer program code which, when run on a network node of a cellular communication network causes the network node to: determine a first cyclic shift parameter for demodulation reference symbols based on a current subframe index; generate a control message comprising the first cyclic shift parameter; and transmit the control message to the wireless device.

According to a fifth aspect, it is presented a computer program product comprising a computer program according to the fourth aspect and a computer readable means on which the computer program is stored. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
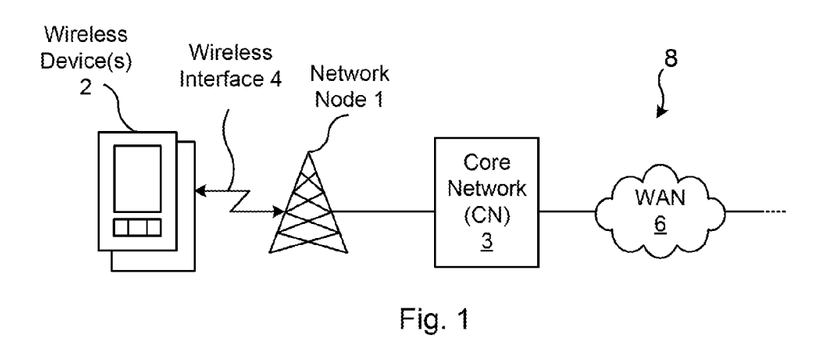
FIG. 1 is a schematic diagram illustrating a cellular communication network where embodiments presented herein may be applied.

FIG. 1 is a schematic diagram illustrating a cellular communication network 8 where embodiments presented herein may be applied. The cellular communication network 8 comprises a core network 3 and one or more network nodes 1, here in the form of radio base stations being evolved Node Bs, also known as eNode Bs or eNBs. The network node 1 could also be in the form of Node Bs, BTSs (Base Transceiver Stations) and/or BSSs (Base Station Subsystems), etc. The network node 1 provides radio connectivity over a wireless interface 4 to a plurality of wireless devices 2. The term wireless device is also known as mobile communication terminal, user equipment (UE), mobile terminal, user terminal, user agent, wireless terminal, machine-to-machine device etc., and can be, for example, what today are commonly known as a mobile phone or a tablet/laptop with wireless connectivity. The term wireless is here to be construed as having the ability to perform wireless communication. More specifically, the wireless device 2 can comprise a number of wires for internal and/or external purposes.

The cellular communication network 8 may e.g. comply with any one or a combination of LTE (Long Term Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Over the wireless interface 4, uplink (UL) communication occurs from the wireless device 2 to the network node 1 and downlink (DL) communication occurs from the network node 1 to the wireless device 2. The quality of the wireless radio interface to each wireless device 2 can vary over time and depending on the position of the wireless device 2, due to effects such as fading, multipath propagation, interference, etc.

The network node 1 is also connected to the core network 3 for connectivity to central functions and a wide area network 6, such as the Internet.

Figure 2A:
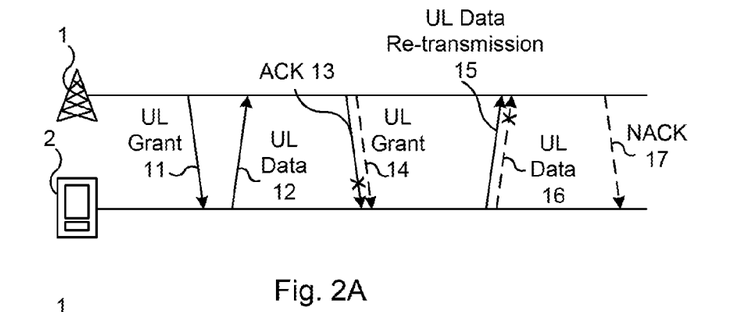
FIGS. 2A-C are schematic signalling diagrams illustrating signalling between a network node and wireless devices for uplink transmissions.
Figure 2B:
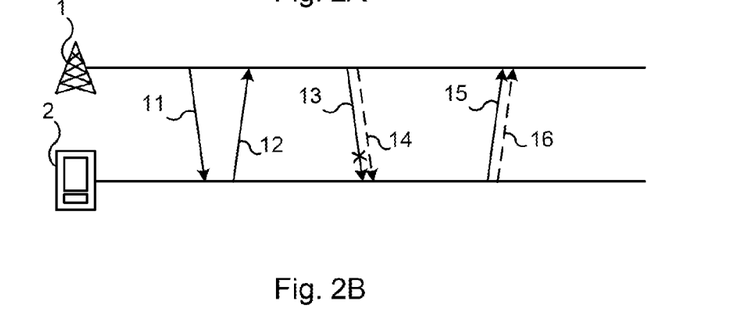
Figure 2C:
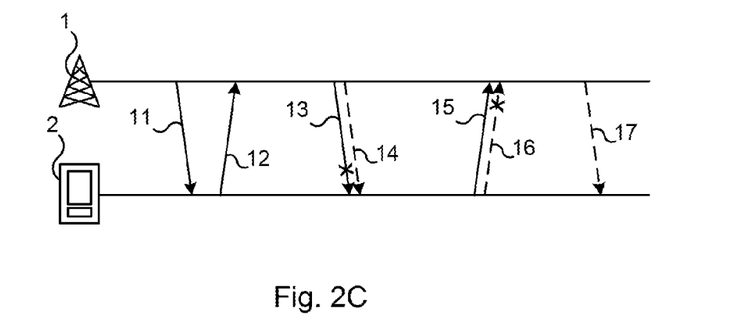

FIGS. 2A-C are schematic signalling diagrams illustrating signalling between a network node 1 and wireless devices 2 for UL transmissions. In FIGS. 2A-C, solid lines indicate transmissions relating to a first wireless device and dashed lines indicate transmissions relating to a second wireless device.

First, the scenario shown in FIG. 2A will be described. Here, the network node schedules an UL transmission for a first wireless device and transmits an UL grant 11 to the first wireless device on a Physical Downlink Control Channel (PDCCH).

The first wireless device then transmits UL data 12 on a Physical Uplink Shared Channel (PUSCH) in accordance with the UL grant 11.

Once the UL data 12 has been received and successful decoded, determined by Cyclic Redundancy Check (CRC) by the network node 1, the network node 1 sends an ACK 13, in accordance with the HARQ procedure, on a Physical HARQ Indication Channel (PHICH). However, errors do sometimes occur for transmissions over the wireless interface, and the first wireless device here misinterprets, indicated by the cross, the ACK as a NACK.

In the same subframe as the ACK 13, the network node transmits an UL grant 14 for the second wireless device on PDCCH. Since the network node 1 has successfully received the UL data 12 from the first wireless device, it is free to reuse the physical resource block (PRB) previously assigned in the UL grant 11 to the first wireless device. Hence, in this example, the UL grant 14 for the second wireless device uses the PRB allocation which was previously part of the UL grant 11 for the first wireless device.

But since the first wireless device considers to have received a NACK, the first wireless device sends a re-transmission 15 of its UL data using the same PRB allocation as defined in the original UL grant 11. However, the second wireless device also transmits UL data 16 in accordance with its UL grant 14.

This leads to both the first wireless device and the second wireless device transmitting UL data 15, 16 using the same PRB allocation which results in a collision of data, e.g. leading to a failure in CRC in the network node.

Since the UL data 16 from the second wireless device UE 2 was not received correctly, a NACK 17 will be transmitted on PHICH to the second wireless device. But the resource that is used for PHICH is based on the start PRB and the cyclic shift for DMRS (Demodulation Reference Symbols), whereby the first wireless device will listen to the same resource and will also retransmit its data as response to the NACK. The conflict will not be resolved until the maximum number of retransmissions is reached.

In FIG. 2B it is illustrated how the issues of FIG. 2A can be mitigated using different cyclic shifts for DMRS. Before describing the details of FIG. 2B, some context to how cyclic shifts for DMRS can be used will be described.

Looking now to HARQ, as explained above, uplink HARQ starts with the network node transmitting an uplink grant to the wireless device on the PDCCH channel. In this grant the network node indicates on which PRBs to transmit, the Modulation and Coding Scheme (MCS) to use, a New Data Indication (NDI) bit to inform the wireless device weather this is a new transmission or a retransmission. The grant also contains a parameter influencing the Cyclic Shift for the Demodulation Reference Symbols (DMRS) which was introduced in 3GPP to support UL Multi-User MIMO (Multiple Input Multiple Output) transmission.

Four subframes (where each subframe is equal to one ms in LTE) after receiving the uplink grant on PDCCH, the wireless device transmits uplink data on PUSCH according to the grant. The network node receives the transmission and attempts to decode the data. The data is protected by channel coding as well as a CRC, so the network node can determine if the data was received correctly.

The network node then indicates to the wireless device whether additional retransmissions are needed or not using an ACK or NACK. This indication takes place on PHICH, eight subframes after the initial grant on PDCCH. The resource that is used on PHICH is related to the start PRB as well as the DMRS cyclic shift used by the wireless device, influenced by the uplink grant for the initial transmission. The fixed timing between the initial transmission and the retransmission is called synchronous HARQ. The wireless device then perform a retransmission if the NACK is received on PHICH (and possibly also PDCCH), and the network node will make another reception attempt. Depending on the result yet another retransmission can take place. However, there is a maximum number of transmissions which is preconfigured using RRC signaling and is typically set to four or five.

Looking now to UL MU (Multi-user) MIMO, two users can be multiplexed on the same time and frequency resource and demultiplexed using e.g. an Interference Rejection Combining (IRC) receiver in the network node. However, for the network node to be able separate the signals for the two transmitting wireless devices, different cyclic shifts for DMRS need to be utilised by the multiplexed wireless devices. When no UL MU-MIMO is used the DMRS cyclic shift is typically kept constant, e.g. 0.

In order to separate several wireless devices that transmit on the same time and frequency resource, a different reference signal must be assigned to each of them. The reference signal consists of a cell specific base sequence and a cyclic shift. For DMRS, there are eight different cyclic shifts to choose between. The cyclic shift applies a phase rotation to the base sequence which results in a unique reference signal. The wireless device specific reference signal makes it possible for the network node to separate the incoming signals from the respective wireless device.

Assume that two wireless devices are transmitting at the same time and frequency resource. The received baseband time domain signal y(n) that corresponds to the allocation size can be expressed as a superposition of signals $y1(n)$ and $y2(n)$ plus noise v(n). Variable $y1(n)$ denotes the signal that is transmitted from a first wireless device to the eNB and $y2(n)$ is the signal from a second wireless device to the eNB. In a DMRS symbol, signal $y1(n)$ and $y2(n)$ can be modelled as a convolution between the channel characteristic $h1(n)$, $h2(n)$ and the reference signals $x1(n)$ and $x2(n)$.

$$y(n)=y_1(n)+y_2(n)+v(n)=h_1(n)*x_1(n)+h_2(n)*x_2(n)+v(n) \quad (1)$$

If the reference signals $x1(n)$ and $x2(n)$ are orthogonal, i.e. $x_1(n)*x_2(n)=0$, and if $x_1^{-1}(n)$ and $x_2^{-1}(n)$ are the inverses of the reference signals, defined as: $x_1(n)*x_1^{-1}(n)=\delta(n)$ and $x_2(n)*x_2^{-1}(n)=\delta(n)$, where $\delta(n)$ is the Kronecker Delta Function, then the channel estimates corresponding to the respective wireless device can be calculated as:

$$\hat{h}_1(n)=F\{y(n)*x_1^{-1}(n)\} \qquad (2)$$

$$\hat{h}_2(n)=F\{y(n)*x_2^{-1}(n)\} \qquad (3)$$

where $F\{x\}$ is an optional function that reduces noise and interference in the channel estimates.

The reference signals used in LTE have both the properties of being orthogonal and having an inverse. Since the reference signals $x_1(n)$ and $x_2(n)$ are orthogonal to each other and invertible, it is possible to separate signal $y(n)$ into two separate signals $y_1(n)$ and $y_2(n)$ in the reference symbols. The wireless device specific signal in the reference symbols is created by convoluting the estimated channel response with the reference signal of the corresponding wireless device:

$$\hat{y}_1(n)=\hat{h}_1(n)*x_1(n) \qquad (4)$$

$$\hat{y}_2(n)=\hat{h}_2(n)*x_2(n) \qquad (5)$$

In the case of MU-MIMO (and SU-MIMO), a linear MMSE (Minimum Mean Squared Error) receiver can be used for removing a co-scheduled interfering wireless device over the data symbols. The linear MU-MIMO MMSE operation on a subcarrier of a data symbol can be performed in the frequency domain using formula (6):

$$x(q)=(H(q)^H H(q)+Q(q))^{-1} H(q)^H y(q) \qquad (6)$$

Variable q denotes the subcarrier number, H(q) is a channel matrix that has the dimensions $n_T*n_R$, where $n_T$ is the number of transmit antennas and $n_R$ is the number of receiver antennas. Matrix Q is a noise covariance matrix which is a symmetric with dimensions equal to the number of transmitting antennas. Matrices H(q) and Q(q) are both calculated using the channel estimates that were derived over the reference symbols through the earlier described signal separation technique. Variable y(q) is a vector with $n_R$ elements. Variable x(q) is a vector with $n_T$ elements, containing the equalized subcarrier symbols for each MU-MIMO wireless device.

In the case of MU-MIMO (and SU-MIMO), an interference cancellation technique may also be used to separate the signal $y(n)$ into its two components $y1(n)$ and $y2(n)$ over the data symbols. This is accomplished by treating the second wireless device as an interferer to the first wireless device and vice versa. There are several different ways to do interference cancellation over data symbols, interference rejection combining, successive interference cancellation, etc.

$$y(n)=y_1(n)+y_2(n)+v(n)=y_1(n)+i(n)+v(n) \qquad (7)$$

To mitigate the i(n) component using IRC, two or more receiver antennas are needed in the network node. If successive interference cancellation is used, one receiver antenna is sufficient. All interference suppression methods require knowledge of the wireless device specific reference signal derived above.

Looking now again to FIG. 2B, different cyclic shifts are here used to reduce the risk of collision of data of FIG. 2A.

In particular, the UL grant 11 to the first wireless device comprises a first cyclic shift parameter with a value of 0. The first cyclic shift parameter affects the cyclic shift of UL transmissions, as explained below.

The UL data 12 is then transmitted with a cyclic shift in accordance with the first cyclic shift parameter being 0. Again, the ACK 13 is interpreted as a NACK by the first wireless device. However, in this embodiment, the UL grant 14 for the second wireless device here includes a value of the first cyclic shift parameter which is different from the UL grant 11 for the first wireless device. For example, the UL grant 14 for the second wireless device can include the first cyclic shift parameter with a value of 1.

The retransmission of UL data 15 from the first wireless device is then transmitted with a cyclic shift which is based on the first cyclic shift parameter being 0 and the transmission of the UL data 16 from the second wireless device is transmitted with a cyclic shift which is based on the first cyclic shift parameter being 1. As explained above, the network node can in many cases successfully decode simultaneous signals from sources with different cyclic shift by treating other signals as interference.

In this way, both the retransmission of UL data 15 from the first wireless device and the transmission of the UL data 16 from the second wireless device can in this case be decoded correctly, solving the problems illustrated in FIG. 2A.

In FIG. 2C, a scenario is illustrated where the same procedure for assigning different first cyclic shift parameters is used as shown in FIG. 2B. Here, however, the transmission of the UL data 16 from the second wireless device is not correctly received by the network node, e.g. due to too much interference from the retransmission of UL data 15 from the first wireless device. Hence, the network node 1 transmits a NACK 17 on PHICH to the second wireless device, using the same first parameter for cyclic shift, i.e. 1 in this example. Since the first parameters for cyclic shift for the first wireless device is different, the first wireless device will, correctly, ignore the NACK and only the second wireless device will retransmit (not shown).

In this way, even when collisions do occur, wireless device specific HARQ feedback prevents repeated collisions in the same HARQ process.

Figure 3A:
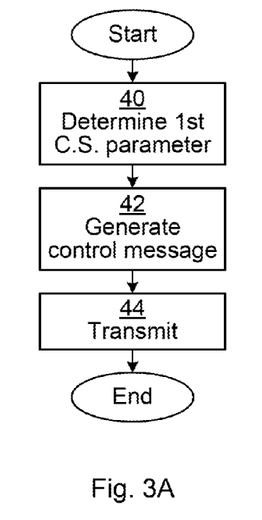
FIGS. 3A-B are flow charts illustrating methods performed in the network node of FIG. 1 for controlling cyclic shift for demodulation reference symbols for uplink communication.
Figure 3B:
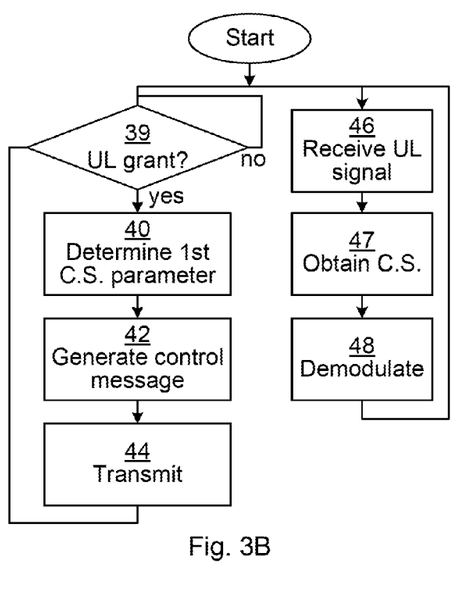

FIGS. 3A-B are flow charts illustrating methods performed in the network node of FIG. 1 for controlling cyclic shift for demodulation reference symbols for uplink communication.

First, the way cyclic shift for DMRS is determined in LTE will be described. This is provided in great detail in 3GPP TS 36.211 V12.1.0, hereinafter denoted 36.211.

As described in section 5.5.2.1.1 of 36.211, the cyclic shift $\alpha_\lambda$ in a slot $n_s$ is given as $\alpha_\lambda=2\pi n_{cs,\lambda}/12$, where $n_{cs,\lambda}=(n_{DMRS}^{(1)}+n_{DMRS,\lambda}^{(2)}+n_{PN}(n_s))\mod 12$. $n_{DMRS}^{(1)}$ is a constant per wireless device and does not change for new transmissions or retransmissions. $n_{PN}(n_s)$ changes for each slot $n_s$ which thus varies twenty times every frame. The pattern for $n_{PN}(n_s)$ repeats every frame and is the same for all wireless device of one cell.

$n_{DMRS,\lambda}^{(2)}$, on the other hand is selected per UL grant and depends on a C.S. field in DCI (Downlink Control Information) format, hereinafter denoted DCI C.S. field and MIMO layer index, also denoted 2 as shown in Table 1, which is a subset of Table 5.5.2.1.1-1 of 36.211, where the DCI C.S. field is here shown in decimal form instead of the binary form in 36.211.

TABLE 1

Mapping of Cyclic Shift Field in uplink-related DCI format to $n_{DMRS,\lambda}^{(2)}$

| DCI C.S. field (in decimal) | $n_{DMRS,\lambda}^{(2)}$ | | | |
|---|---|---|---|---|
| | $\lambda = 0$ | $\lambda = 1$ | $\lambda = 2$ | $\lambda = 3$ |
| 0 | 0 | 6 | 3 | 9 |
| 1 | 6 | 0 | 9 | 3 |
| 2 | 3 | 9 | 6 | 0 |
| 3 | 4 | 10 | 7 | 1 |
| 4 | 2 | 8 | 5 | 11 |
| 5 | 8 | 2 | 11 | 5 |
| 6 | 10 | 4 | 1 | 7 |
| 7 | 9 | 3 | 0 | 6 |

It is thus possible to control the cyclic shift from a network node by the signalling of a first cyclic shift parameter in the form of the DCI C.S. field. In this way, as explained above with reference to FIGS. 2B-C, at least some conflicts due to misinterpreted signalling can be avoided.

Now, the method of FIG. 3A will be described.

In a determine first C.S. (cyclic shift) parameter step 40, a first cyclic shift parameter for demodulation reference symbols based on a current subframe index is determined. The first cyclic shift parameter can be the DCI C.S. field used in LTE, or any other suitable field which affects the cyclic shift of DMRS used in the wireless device.

In one embodiment, the same first cyclic shift parameter for a number of subframes is used which corresponds to the round trip time for HARQ. In other words, the first cyclic shift parameter then changes periodically at an interval which corresponds to the round trip time for HARQ, e.g. as shown in Table 2 below.

The selection of the first cyclic shift parameter according to one embodiment is illustrated in Table 2:

In subframe 0, the network node sends an UL grant, including the first cyclic shift parameter with a value of 0 to the first wireless device WD1. Four subframes later, the first wireless device WD1 transmits its UL data as a new transmission with a cyclic shift parameter which is determined based on the first cyclic shift parameter 0.

In subframe 8, the network node sends an UL grant, including the first cyclic shift parameter with a value of 1 to the second wireless device WD2. Four subframes later, in subframe 12, the second wireless device WD2 transmits its UL data as a new transmission with a cyclic shift parameter which is determined based on the first cyclic shift parameter 1. In the same subframe, the first wireless device WD1 sends a retransmission of its UL data (e.g. due to the scenario of FIG. 2B explained above). Retransmissions are performed with the same cyclic shift as the original transmission, whereby the cyclic shift for the retransmission from the first wireless device WD1 is still based on the first cyclic shift parameter of 0.

In this way, the network node can, in subframe 12, distinguish between the two UL transmissions since these are based on different first cyclic shift parameters.

This principle can be expanded for more wireless devices as shown in Table 2, as long as the UL transmission from each wireless device is based on a different first cyclic shift parameter.

In one embodiment, the first cyclic shift parameter is associated with a set of second cyclic shift parameters, wherein each one of the second cyclic shift parameters corresponds to a MIMO layer, as illustrated in Table 1 above. The set of second cyclic shift parameter is then the set of $n_{DMRS,\lambda}^{(2)}$ parameters for the various MIMO layer indices ($\lambda$ values) for one DCI C.S. field.

Since each value of the DCI C.S. field define four different values of $n_{DMRS,\lambda}^{(2)}$, the selection of consecutive values for

TABLE 2

Example of selection of the first cyclic shift parameter

| $Idx_{SF}$ | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| CSP1 | 0 | 0 | 0 | 0 | 0 | 0 | 0 | 0 | 1 | 1 | 1 | 1 | 1 | 1 | 1 | 1 | 2 | 2 | 2 | 2 | 2 | 2 | 2 | 2 | 3 |
| HARQ | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 | 0 |
| WD1 TX | G 0 | | | | N 0 | | | | | | | | R 0 | | | | | | | | R 0 | | | | |
| WD2 TX | | | | | | | | | G 1 | | | | N 1 | | | | | | | | R 1 | | | | |
| WD3 TX | | | | | | | | | | | | | | | | | G 2 | | | | N 2 | | | | |
| WD4 TX | | | | | | | | | | | | | | | | | | | | | | | | | G 3 |

Table 2 is an example illustrating the relationship between various parameters. In the first column, $Idx_{SF}$ denotes the subframe index, $CSP_1$ denotes the first cyclic shift parameter, HARQ denotes the HARQ process number, and WDx TX denotes transmission from wireless device x. In the main part of Table 2, N denotes new transmission and R denotes retransmission. For the WDx TX rows, the numbers indicate the first cyclic shift parameter value used for the wireless device in question. 'G' denotes an UL grant, including the first cyclic shift parameter. 'N' denotes a new transmission of UL data and 'R' denotes a retransmission of UL data.

In Table 2, it is seen how the subframe index increases with one with each subframe. The first cyclic shift parameter is determined as described herein.

the DCI C.S. field is not trivial. In particular, it is desired that risk of the same value of $n_{DMRS,\lambda}^{(2)}$ being used consecutively (for any $\lambda$) is low.

For instance, when a new first cyclic shift parameter is to be selected, a first cyclic shift parameter (such as the DCI C.S. field) can be selected which is associated with a set of second cyclic shift parameters which all differ from all the second cyclic shift parameters associated with the previous first cyclic shift parameter. In other words, the next DCI C.S. field is selected such that no value of $n_{DMRS,\lambda}^{(2)}$ is the same as any preceding value of $n_{DMRS,\lambda}^{(2)}$. One example of such sequential selection is shown in Table 3, where the selections of DCI C.S. are progressed vertically.

TABLE 3 second cyclic shift parameter based on
C.S. field in DCI format and MIMO layer

| DCI C.S. Field (in decimal) | $n_{DMRS,\lambda}^{(2)}$ | | | |
|---|---|---|---|---|
| | $\lambda = 0$ | $\lambda = 1$ | $\lambda = 2$ | $\lambda = 3$ |
| 0 | 0 | 6 | 3 | 9 |
| 3 | 4 | 10 | 7 | 1 |
| 5 | 8 | 2 | 11 | 5 |
| 2 | 3 | 9 | 6 | 0 |
| 6 | 10 | 4 | 1 | 7 |
| 4 | 2 | 8 | 5 | 11 |

Looking to Table 3, the first DCI C.S. field value of 0 implies the use of values 0, 6, 3 and 9 for $n_{DMRS,\lambda}^{(2)}$ for the various MIMO layer indices ($\lambda$), according to Table 1 above. The second DCI C.S. field value is here 3, implying the use of values 4, 10, 7 and 1 for $n_{DMRS,\lambda}^{(2)}$ for the various MIMO layer indices ($\lambda$), which all differ from the $n_{DMRS,\lambda}^{(2)}$ values of the previous DCI C.S. value. This principle is then applied to any successive values of the DCI C.S. field in Table 3 which loops around.

The MIMO layer 0 may be prioritised in the selection of cyclic shift to reduce the risk of collisions as described with reference to FIG. 2A above. This can for example be achieved by, when a new first cyclic shift parameter is to be selected, selecting a first cyclic shift parameter (e.g. DCI C.S. field value) such that the associated second cyclic shift parameter (e.g. $n_{DMRS,\lambda}^{(2)}$) for the lowest MIMO layer (e.g. $\lambda=0$) is not repeated in a number of consecutive first cyclic shift parameters which is equal to the maximum number of HARQ transmissions. In other words, if the maximum number of HARQ transmissions is set to 4, then the value $n_{DMRS,\lambda}^{(2)}$ should not be repeated for $\lambda=0$ for at least 4 values of DCI C.S. The example shown in Table 3 satisfies this.

However, repetition of values for $n_{DMRS,\lambda}^{(2)}$ can often not be completely avoided and such repetition then preferably occurs for higher MIMO layer indices. In Table 3, for example, there are repetitions of many $n_{DMRS,\lambda}^{(2)}$ values but no repetitions within $\lambda=0$ and no repetitions between two successive DCI C.S. field values.

In a generate control message step 42, a control message comprising the first cyclic shift parameter is generated.

In a transmit step 44, the control message is transmitted to a wireless device of the cellular communication network. The control message can e.g. be a downlink control information message and be combined with an UL grant sent to the wireless device.

In FIG. 3B, another embodiment of a method for controlling cyclic shift of DMRS for UL communication is illustrated.

Here, prior to the determine first C.S. parameter step 30, there is a conditional UL grant step 39. In this step, it is determined whether there is an UL grant to be transmitted. If this is the case, the method proceeds to the determine first C.S. parameter step 40. Otherwise, the method repeats the conditional UL grant step 39, optionally after an idle period (not shown).

In parallel to the steps 39, 40, 42 and 44 on the left hand side of FIG. 3B relating to the UL grant, there is a set of steps 46, 47 and 48 on the right hand of FIG. 3B relating to the reception of UL signals.

In a receive UL signal step 46, an uplink signal is received which comprises an uplink signal component from the first wireless device and an uplink signal component from a second wireless device. There may also be uplink signal components from more wireless devices.

In an obtain C.S. step 47, a cyclic shift for DMRS used by the first wireless device is calculated using the first cyclic shift parameter. This can be done as explained above since the network node is aware of all the input parameters for the calculation of cyclic shift. Analogously, the cyclic shift for DMRS used by the second wireless device can be obtained.

In a demodulate step 48, the uplink signal is demodulated based on the cyclic shift to reduce interference from the uplink signal component from the second wireless device, e.g. using receivers for UL MIMO reception, to be able to distinguish the uplink signal component from the first wireless device. Analogously, the uplink signal component from the second wireless device can be distinguished using a cyclic shift for the second wireless device.

Figure 4:
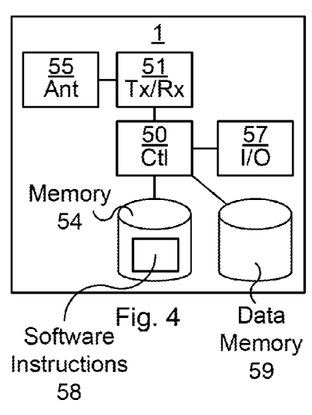
FIG. 4 is a schematic diagram showing some components of the network node of FIG. 1.

FIG. 4 is a schematic diagram showing some components of the network node of FIG. 1. A processor 50 is provided using any combination of one or more of a suitable central processing unit (CPU), multiprocessor, microcontroller, digital signal processor (DSP), application specific integrated circuit etc., capable of executing software instructions 58 stored in a memory 54, which can thus be a computer program product. The processor 50 can be configured to execute the method described with reference to FIGS. 3A-B above.

The memory 54 can be any combination of read and write memory (RAM) and read only memory (ROM). The memory 54 also comprises persistent storage, which, for example, can be any single one or combination of magnetic memory, optical memory, solid state memory or even remotely mounted memory.

A data memory 59 is also provided for reading and/or storing data during execution of software instructions in the processor 50. The data memory 59 can be any combination of read and write memory (RAM) and read only memory (ROM). For example, the data memory 59 can store cyclic shift parameters.

The network node 1 further comprises an I/O interface 57 for communicating with other external entities. Optionally, the I/O interface 57 also includes a user interface.

The network node 1 also comprises one or more transceivers 51, comprising analogue and digital components, and a suitable number of antennas 55 for wireless communication with wireless devices as shown in FIG. 1.

Other components of the network node 1 are omitted in order not to obscure the concepts presented herein.

Figure 5:
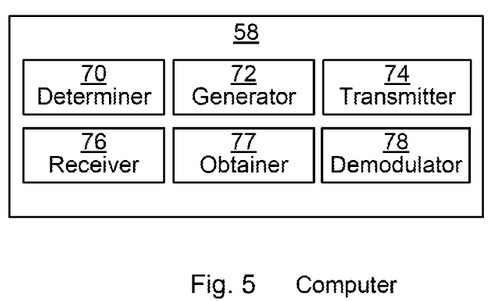
FIG. 5 is a schematic diagram showing functional modules of the software instructions of the network node of FIG. 4 according to one embodiment.

FIG. 5 is a schematic diagram showing functional modules of the software instructions 58 of the network node of FIG. 4 according to one embodiment. The modules are implemented using software instructions such as a computer program executing in the network node 1. The modules correspond to the steps in the methods illustrated in FIGS. 3A-B.

A determiner 70 is arranged to determine a first cyclic shift parameter for demodulation reference symbols based on a current subframe index. This module corresponds to the determine first C.S. parameter step 40 of FIGS. 3A-B.

A generator 72 is arranged to generate a control message comprising the first cyclic shift parameter. This module corresponds to the generate control message step 42 of FIGS. 3A-B.

A transmitter 74 is arranged to transmit the control message to a wireless device of the cellular communication network. This module corresponds to the transmit step 44 of FIGS. 3A-B.

A receiver 76 is arranged to receive an uplink signal comprising an uplink signal component from the first wireless device and an uplink signal component from a second wireless device. This module corresponds to the receive UL signal step 46 of FIG. 3B.

An obtainer 77 is arranged to obtain a cyclic shift for demodulation reference symbols used by the first wireless device using the first cyclic shift parameter. This module corresponds to the obtain C.S. step 47 of FIG. 3B.

A demodulator 78 is arranged to demodulate the uplink signal based on the cyclic shift to reduce interference from the uplink signal component from the second wireless device. This module corresponds to the demodulate step 48 of FIG. 3B.

Figure 6:
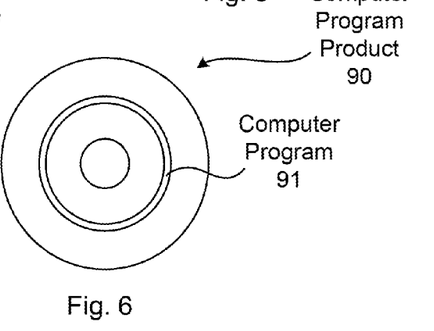
FIG. 6 shows one example of a computer program product comprising computer readable means.

FIG. 6 shows one example of a computer program product comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 54 of FIG. 4. While the computer program 91 is here schematically shown as a track on the depicted optical disk, the computer program can be stored in any way which is suitable for the computer program product, such as a removable solid state memory, e.g. a Universal Serial Bus (USB) drive.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method in a network node for determining a cyclic shift for demodulation reference symbols for uplink communications in a cellular communication network, the method comprising:
   determining a first cyclic shift parameter for the demodulation reference symbols based on a current subframe index, wherein the determining includes utilizing the same first cyclic shift parameter for a number of subframes that corresponds to a round trip time for Hybrid Automatic Repeat Request (HARQ);
   generating a control message comprising the first cyclic shift parameter; and
   transmitting the control message to a first wireless device of the cellular communication network.

2. The method according to claim 1, wherein said determining, generating and transmitting are repeated for each uplink grant of a plurality of uplink grants.

3. The method according to claim 1, further comprising:
   receiving an uplink signal comprising an uplink signal component from the first wireless device and an uplink signal component from a second wireless device;
   obtaining a cyclic shift for demodulation reference symbols used by the first wireless device using the first cyclic shift parameter; and
   demodulating the uplink signal based on the cyclic shift to reduce interference from the uplink signal component from the second wireless device.

4. The method according to claim 3, wherein the demodulating comprises using receivers for uplink multi-user multiple input multiple output (MIMO) reception.

5. The method according to claim 1, wherein the first cyclic shift parameter is associated with a set of second cyclic shift parameters, wherein each one of the second cyclic shift parameters corresponds to a multiple input multiple output (MIMO) layer.

6. The method according to claim 5, wherein the determining a first cyclic shift parameter comprises, when a new first cyclic shift parameter is to be selected, selecting a first cyclic shift parameter associated with a set of second cyclic shift parameters which all differ from all the second cyclic shift parameters associated with the previous first cyclic shift parameter.

7. The method according to claim 5, wherein the determining a first cyclic shift parameter comprises, when a new first cyclic shift parameter is to be selected, selecting a first cyclic shift parameter such that the associated second cyclic shift parameter for the lowest MIMO layer is not repeated in a number of consecutive first cyclic shift parameters which is equal to the maximum number of HARQ transmissions.

8. The method according to claim 1, wherein the transmitting the control message comprises transmitting a downlink control information message.

9. A network node for determining a cyclic shift for demodulation reference symbols for uplink communications in a cellular communication network, the network node comprising:
   a processor; and
   a memory storing instructions that, when executed by the processor, cause the network node to:
      determine a first cyclic shift parameter for the demodulation reference symbols based on a current subframe index, which includes utilizing the same first cyclic shift parameter for a number of subframes that corresponds to a round trip time for Hybrid Automatic Repeat Request (HARQ);
      generate a control message comprising the first cyclic shift parameter; and
      transmit the control message to a first wireless device of the cellular communication network.

10. The network node according to claim 9, further comprising instructions that, when executed by the processor, cause the network node to repeat the instructions to determine, generate and transmit for each uplink grant of a plurality of uplink grants.

11. The network node according to claim 9, further comprising instructions that, when executed by the processor, cause the network node to:
   receive an uplink signal comprising an uplink signal component from the first wireless device and an uplink signal component from a second wireless device;
   obtain a cyclic shift for demodulation reference symbols used by the first wireless device using the first cyclic shift parameter; and
   demodulate the uplink signal based on the cyclic shift to reduce interference from the uplink signal component from the second wireless device.

12. The network node according to claim 11, wherein the instructions to demodulate comprise instructions that, when executed by the processor, cause the network node to use receivers for uplink multi-user multiple input multiple output (MIMO) reception.

13. The network node according to claim 9, wherein the first cyclic shift parameter is associated with a set of second cyclic shift parameters, wherein each one of the second cyclic shift parameters corresponds to a multiple input multiple output (MIMO) layer.

14. The network node according to claim 13, wherein the instructions to determine a first cyclic shift parameter comprise instructions that, when executed by the processor, cause the network node to, when a new first cyclic shift parameter is to be selected, select a first cyclic shift parameter associated with a set of second cyclic shift parameters which all differ from all the second cyclic shift parameters associated with the previous first cyclic shift parameter.

15. The network node according to claim 13, wherein the instructions to determine a first cyclic shift parameter comprise instructions that, when executed by the processor, cause the network node to, when a new first cyclic shift parameter is to be selected, selecting a first cyclic shift parameter such that the associated second cyclic shift parameter for the lowest MIMO layer is not repeated in a number of consecutive first cyclic shift parameters which is equal to the maximum number of HARQ transmissions.

16. The network node according to claim 9, wherein the instructions to transmit the control message comprise instructions that, when executed by the processor, cause the network node to transmit a downlink control information message.

17. A non-transitory machine readable medium having instructions which, when executed by one or more processors of a device, cause the device to determine a cyclic shift for demodulation reference symbols for uplink communications in a cellular communication network by performing operations comprising:
   determining a first cyclic shift parameter for the demodulation reference symbols based on a current subframe index, wherein the determining includes utilizing the same first cyclic shift parameter for a number of subframes that corresponds to a round trip time for Hybrid Automatic Repeat Request (HARQ);
   generating a control message comprising the first cyclic shift parameter; and
   transmitting the control message to a first wireless device of the cellular communication network.

18. The non-transitory machine readable medium of claim 17, wherein the operations further comprise:
   receiving an uplink signal comprising an uplink signal component from the first wireless device and an uplink signal component from a second wireless device;
   obtaining a cyclic shift for demodulation reference symbols used by the first wireless device using the first cyclic shift parameter; and
   demodulating the uplink signal based on the cyclic shift to reduce interference from the uplink signal component from the second wireless device.

* * * * *